United States Patent [19]

Smale

[11] Patent Number: 5,624,352

[45] Date of Patent: Apr. 29, 1997

[54] IGNITION-CONTROLLED PARKING BRAKE INTERLOCK

[75] Inventor: Randall D. Smale, Farmington Hills, Mich.

[73] Assignee: Dura Automotive Systems, Inc., Rochester Hills, Mich.

[21] Appl. No.: 523,672

[22] Filed: Sep. 5, 1995

[51] Int. Cl.⁶ .................................................. B60K 41/20
[52] U.S. Cl. ........................ 477/197; 477/194; 192/4 A
[58] Field of Search ..................................... 477/197, 194; 192/4 A

[56] References Cited

U.S. PATENT DOCUMENTS

| | | | |
|---|---|---|---|
| 1,225,135 | 5/1917 | Josephson | 74/535 |
| 2,642,145 | 6/1953 | Feyes | 180/271 |
| 2,789,667 | 4/1957 | Tanneneaum et al. | 188/110 |
| 2,959,261 | 11/1960 | Hemphill | 477/197 |
| 4,076,093 | 2/1978 | Mizuno | 477/197 X |
| 4,265,345 | 5/1981 | Fasano | 477/194 |
| 4,281,736 | 8/1981 | Lizzio | 192/4 A X |
| 4,421,214 | 12/1983 | Seilmeyer | 192/4 A |
| 4,462,487 | 7/1984 | Warwick et al. | 477/194 X |
| 4,553,650 | 11/1985 | Warwick et al. | 477/194 X |
| 4,646,903 | 3/1987 | Han | 477/194 |
| 4,991,699 | 2/1991 | Hiraiwa et al. | 477/197 |

*Primary Examiner*—Charles A. Marmor
*Assistant Examiner*—Peter T. Kwon
*Attorney, Agent, or Firm*—David A. Greenlee

[57] ABSTRACT

A ignition-controlled parking brake interlock is provided for a vehicle. The parking brake operating lever is latched in brake-applied positions by engagement of a lever-mounted pawl with fixed sector. A solenoid is movable between positions blocking and unblocking movement of the vehicle ignition to OFF. A lock bar carried by the lever is movable by a second solenoid between positions blocking and unblocking movement of the pawl to release the lever. In one embodiment, a brake lever position switch and a switch operated by the second solenoid control solenoid operation to prevent ignition key removal unless the parking brake is applied and to prevent parking brake release unless the key is inserted and the ignition moved to RUN. In another embodiment, bi-stable solenoids are controlled by a controller that is provided with high and low current inputs from branch circuits that include control switches operated by ignition position and parking brake lever position.

12 Claims, 6 Drawing Sheets

IGNITION-CONTROLLED PARKING BRAKE INTERLOCK

BACKGROUND OF THE INVENTION

This invention relates generally to vehicle parking brakes and, more particularly, to a vehicle and park brake and ignition interlock.

Many systems have been developed for vehicles which deter theft by preventing movement of the steering wheel when the ignition is switched to OFF and the ignition key is removed. Systems have also been developed which prevent movement of an automatic transmission out of PARK when the vehicle ignition is switched to OFF and the ignition key is removed. All of these systems are designed to prevent inadvertent forward vehicle motion.

No similar system has been previously developed for manual transmission vehicles, since a manual transmission has no transmission position equivalent to PARK. However, unless the vehicle parking brake is engaged, the manual transmission shift lever can be moved to NEUTRAL or to a forward gear which can permit inadvertent, uncontrolled forward motion of the vehicle.

It would be desirable to provide an ignition interlock system for a manual transmission vehicle which prevents movement of the vehicle when the vehicle ignition is in the OFF position with the key removed.

SUMMARY OF THE INVENTION

It is therefore an object of this invention to provide an ignition interlock system for a manual transmission vehicle which prevents movement of the vehicle when the vehicle ignition is in the OFF position with the key removed.

In one aspect, this invention features a parking brake lock for a vehicle having a parking brake operator which includes a lever movable between a brake-released position and a range of brake-applied positions. The lock comprises a latch member, biasing means biasing the latch member into engagement with the lever in any brake-applied position to latch the lever in said position, release means connected to the latch member for disengaging the latch member from the lever and permit movement of the lever to brake-released position, release disabling means operable to prevent the release means from disengaging the latch member from the lever, and control means for operating the release disabling means.

Preferably, the lever mounts a notched latch plate and the latch member includes a pawl engageable with the latch plate notches to latch the lever in a brake-applied position and the release disabling means includes a lock bar movable into and out of a position blocking movement of the pawl out of engagement with the lever.

In another aspect, this invention features a parking brake lock for a vehicle having an ignition movable between a RUN and a plurality of non-RUN positions including OFF, and a parking brake operator including a lever movable between a brake-released position and a range of brake-applied positions. The lock comprises a latch member, biasing means biasing the latch member into engagement with the lever in any brake-applied position to latch the lever in said position, and release means connected to the latch member for disengaging the latch member from the lever and permit movement of the lever to brake-released position. Release disabling means are provided to prevent the release means from disengaging the latch member from the lever, and control means, including means responsive to the position of the ignition, operate the release disabling means.

Preferably, the control means include means responsive to movement of the vehicle ignition to a non-RUN position to move the lock device to lock position, an ignition blocking device having a position normally blocking movement of the ignition to OFF and operable to move to a position enabling said movement, and means responsive to movement of the lock device to lock position to enable movement of the blocking device to the position enabling movement of the ignition to OFF.

In yet another aspect, this invention features a parking brake and ignition interlock for a vehicle having an ignition movable among OFF, ACCESSORY and RUN positions, a parking brake operator including a lever operable to move between a brake-released position and a range of brake-applied positions, a latch member movable into and out of engagement with the lever to latch the lever in any of a plurality of brake-applied positions, and a power source. The interlock comprises a first electrical device movable between positions blocking and unblocking movement of the ignition to OFF, a lock bar movable to a position blocking disengagement of the latch member from the lever, and a second electrical device for moving the lock bar between positions blocking and unblocking movement of the latch from latched to unlatched positions to lock the lever against movement out of a brake-applied position. A position switch is actuated by movement of the lever to a brake-applied position, and control means, including an electrical circuit connect the power source, the first and second electrical devices, the control means, the position switch and the ignition. The control means responds to the combined movement of the lever out to a brake-applied position and movement of the ignition to ACCESSORY to cause the second electrical device to move to blocking position and cause the first electrical device to move to unblocking position, thereby locking the lever in brake-applied position and enabling movement of the ignition to OFF.

Preferably, the interlock includes first and second control switches operated by the ignition, the first control switch being closed in the RUN position and open in the ACCESSORY and OFF positions and the second control switch being closed in the RUN and ACCESSORY positions and open in the OFF position. The first and second electrical devices are preferably bi-stable solenoids extensible to blocking position and retractable to unblocking position, the control means include a controller which responds to a low input signal to retract the first solenoid and extend the second solenoid and which responds to a high input signal to extend the first solenoid and retract the second solenoid, and the electrical circuit includes a first branch including the first control switch and a second branch including the second control switch. Each branch connects the power source and the controller to provide a low input signal to the controller when open and to provide a high input signal to the controller when closed. The second branch has a leg including the position switch connecting the second branch to ground when closed to cause the second branch to provide a low input signal even if the second control switch is closed.

These and further objects and features of this invention will become more readily apparent upon reference to the following detailed description of a preferred embodiment, as illustrated in the accompanying drawings, in which:

DETAILED DESCRIPTION OF PREFERRED EMBODIMENTS

Figures 1, 2:
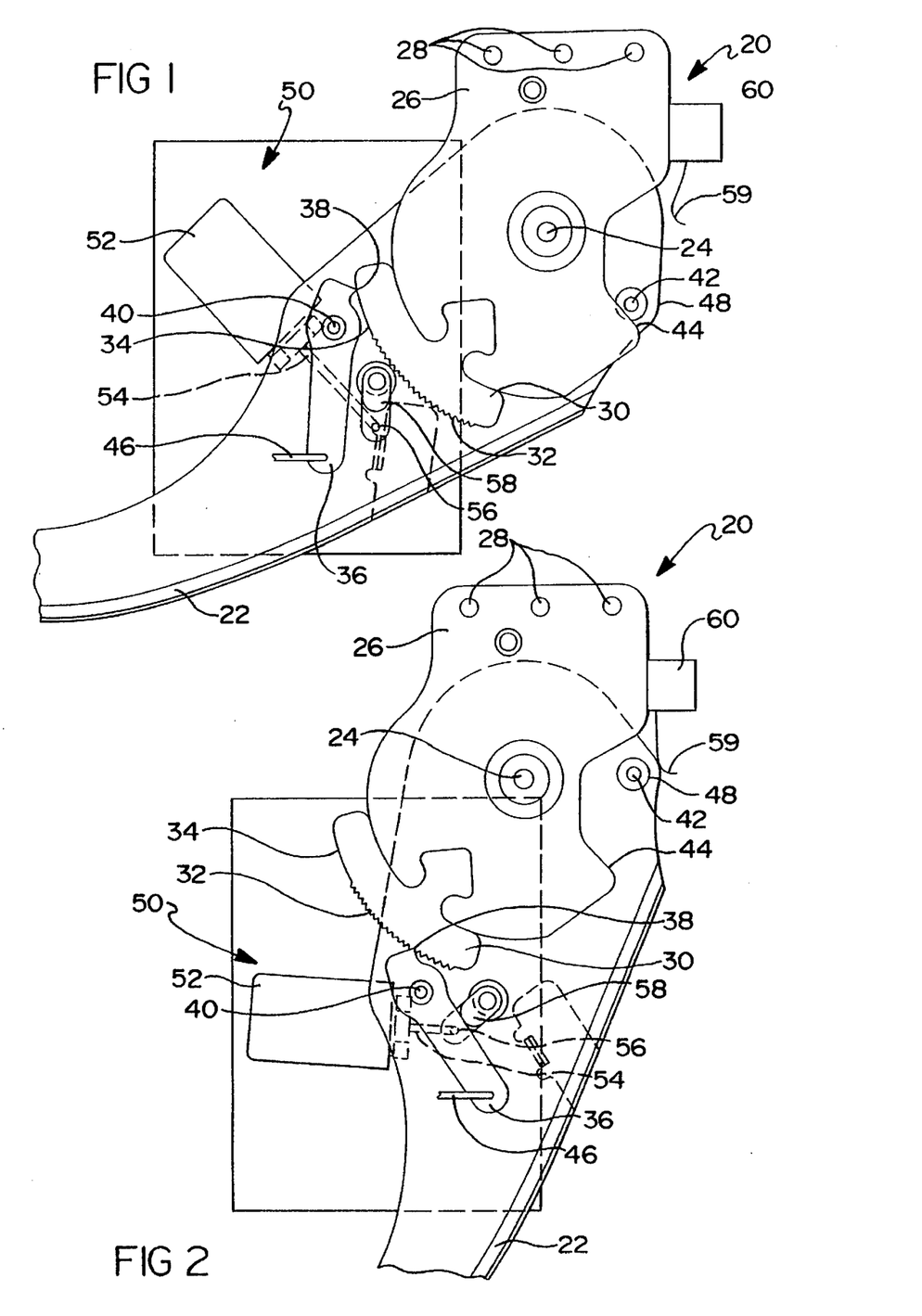
FIG. 1 is a partial side view of a parking brake actuator having a latching pawl and incorporating an ignition-controlled parking brake lock having a pawl lock bar according to this invention, with the actuator shown in brake-released position.
FIG. 2 is a view similar to FIG. 1, with the actuator shown in a brake-applied position and the pawl lock bar in blocking position.

Referring now to FIGS. 1 and 2 of the drawings, a parking brake actuator 20 includes an actuating lever 22 that mounts a conventional foot pad at its distal end (not shown) for foot operation. Lever 22 is pivotable about a pivot 24 carried by a mounting bracket 26 that is conventionally mounted to vehicle structure (not shown) via fasteners through mounting holes 28.

Mounting bracket 26 mounts a sector 30 having ratchet teeth 32 and a flat land 34. Lever 22 pivotally mounts a latching pawl 36 which has a nose 38 that is biased into engagement with sector 30 about a pivot 40 by a spring (not shown). Lever 22 is conventionally operationally attached to a brake operating cable for operating a vehicle parking brake. Such attachment and operation are not here illustrated since they are conventional and form no part of this invention.

Lever 22 is conventionally movable about pivot 24 between a brake released position, shown in FIG. 1 and a plurality of brake-applied positions, one of which is shown in FIG. 2. Lever 22 also mounts a resilient bumper 42 that is engageable with a shoulder 44 on bracket 26 in the brake released FIG. 1 position. In this brake-released position, pawl nose 38 engages sector land 34.

As lever 22 is moved out of brake-released position to apply the parking brake, nose 38 slides along land 34 until it engages teeth 32. As lever 22 continues to move, nose 38 ratchets over teeth 32 until lever 22 is stopped. Pawl 36 will then latch lever 22 in the selected brake-applied position because of its geometry, as is well-known. Lever 22 can normally be moved out of its brake-applied position by operation of a pawl release rod 46 which is manually or automatically operated to pivot pawl nose 38 out of engagement with ratchet teeth 32.

Thus far the operation described is conventional. As previously discussed, it is desirable to lock parking brake actuator 20 in the brake-applied position when the vehicle ignition is in OFF position. This is accomplished by operation of pawl release disabling means 50 which comprises a solenoid 52 having an output rod or plunger 54 that operates a link 56 that is pivotally mounted on lever 22 adjacent pawl 36. Link 56 mounts a lock bar 58 that moves with link 56 to selectively block release movement of pawl 36.

When solenoid 52 is operated to retract plunger 54, as in FIG. 2, lock bar 58 engages pawl 36 to prevent disengagement of nose 38 from ratchet teeth 32, thus locking parking brake actuator 20 in the brake-applied position. When plunger 54 is extended, it pivots lock bar 58 out of pawl engagement, which enables release rod 46 to disengage pawl nose 38 from teeth 32. This permits lever 22 to move to the brake-released position of FIG. 1, with bumper 42 in engagement with bracket shoulder 44. In this brake-released position, an upper shoulder 48 of lever 22 engages and actuates an operator 59 of a brake position switch 60.

FIGS. 3–9 are a sequence of schematic illustrations of operation of one embodiment of an ignition-controlled parking brake lock according to this invention. Previously discussed lever 22, solenoid 52, plunger 54, link 56 and lock bar 58 are shown schematically, as are brake position switch 60, a vehicle ignition 62 and its ignition key 64 which can only be removed in the OFF position of ignition 62.

Figure 3:
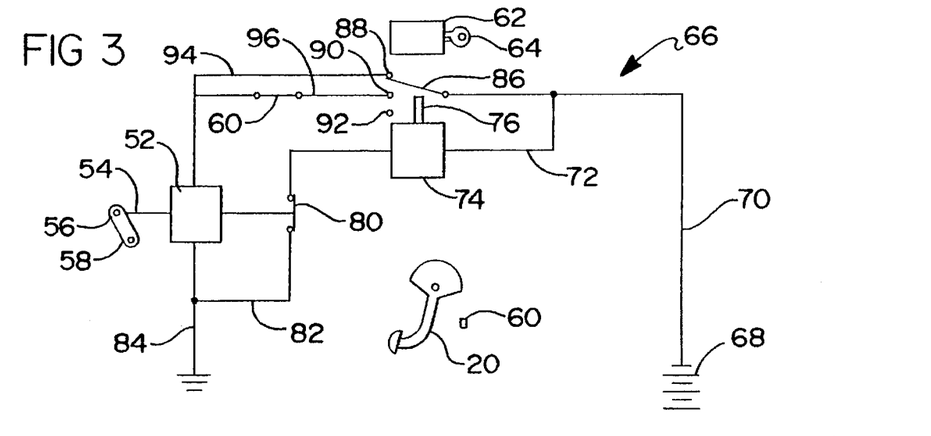
FIG. 3 is a schematic of one embodiment of an electrical control circuit for an ignition-controlled parking brake lock according to this invention, with the parking brake shown in brake-released position of FIG. 1, with the blocking solenoid retracted, the ignition in RUN position, and the ignition blocking solenoid extended.

A control circuit 66 includes a source of power 68 connected by a line 70 and a branch line 72 to an ignition blocking solenoid 74 having a plunger 76. A line 78 connects solenoid 74 through a switch 80, which is operated by blocking solenoid 52, and a line 82 to a line 84 which connects blocking solenoid 52 to ground. Line 70 also connects to an ignition-operated three-position switch 86, which is movable among terminals 88, 90 and 92. Terminal 88 connects to a line 94 leading to blocking solenoid 52, and corresponds to an ignition RUN position. Terminal 90 connects to a line 96, which connects through shift position switch 60 to line 94, and corresponds to an ignition ACCESSORY position. Terminal 92 is dead, and corresponds to an ignition OFF and locked position.

Both solenoids 52 and 72 are power-extended and spring-retracted. When plunger 76 is extended, it blocks ignition 62 from movement to OFF position and prevents removal of key 64. Switch 60 is normally closed and is opened by movement of the parking brake lever 22 to a brake-applied position.

FIG. 3 shows the circuit when ignition 62 is in RUN position, and the parking brake lever 22 is in brake-released position. As such, a circuit is completed through line 70, switch 86, contact 88 and line 94 to power solenoid 52 and maintain plunger 54 extended. This closes switch 80 to complete a circuit via lines 70, 72, 78 and 82 and switch 80 to power solenoid 74 and maintain plunger 76 extended, preventing removal of key 64 from ignition 62.

Figure 4:
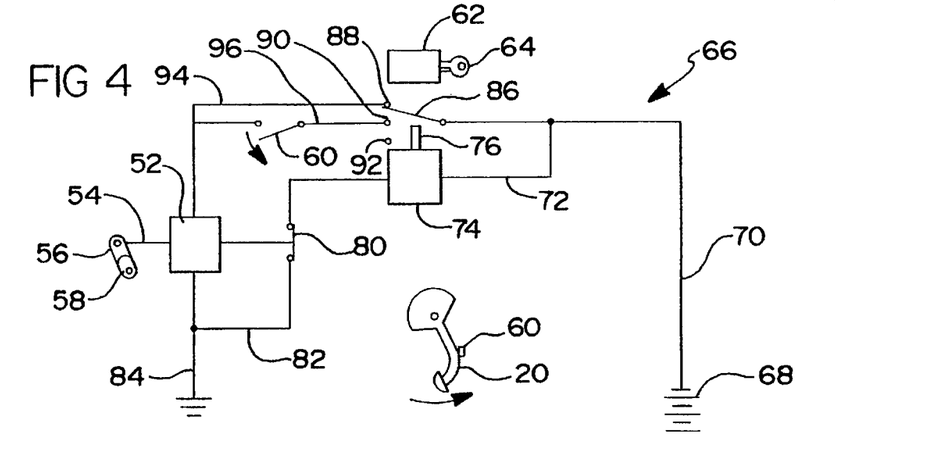
FIG. 4 is a view similar to FIG. 3, with the actuator moved the brake-applied position of FIG. 2 and actuating a position switch.
Figure 5:
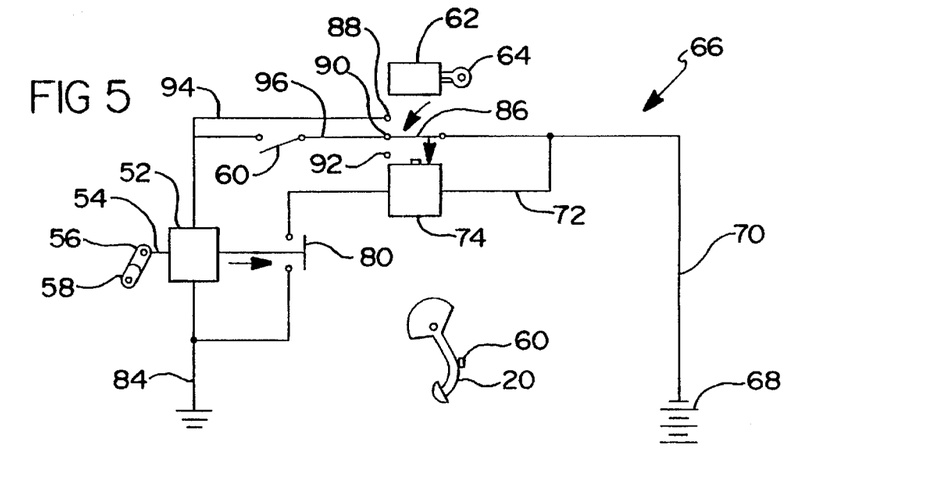
FIG. 5 is a view similar to FIG. 4, illustrating the result of position switch actuation, which enable key movement to ACCESSORY and causes the ignition blocking solenoid to retract its blocking member and causes the pawl blocking solenoid to retract and move the pawl lock bar to blocking position.
Figure 6:
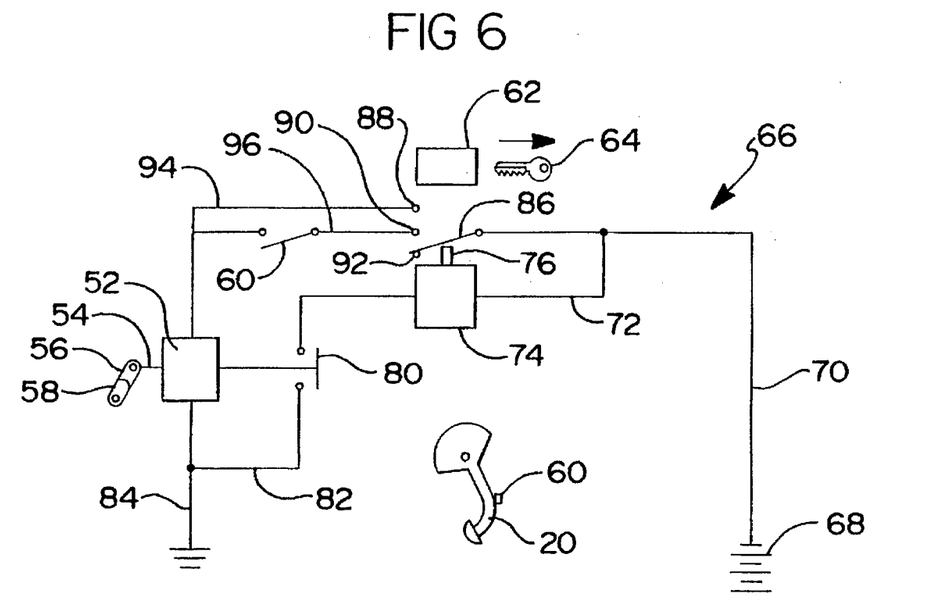
FIG. 6 is a view similar to FIG. 5, illustrating the result of retraction of the ignition blocking solenoid which enables the ignition to move to OFF and permits key removal.

FIG. 4 shows that movement of parking brake lever 22 to the FIG. 2 brake-applied position opens switch 60. Subsequent movement of switch 86 to terminal 90 by moving ignition 62 to ACCESSORY (FIG. 5) breaks the circuit to cut off power to solenoid 52. Plunger 54 is then spring retracted, which opens switch 80, breaking the circuit and cutting off power to solenoid 76, as shown. With solenoid 74 unpowered, plunger 76 will spring-retract (FIG. 5). Since switch 86 is now completely unblocked by retraction of plunger 76, it can be moved to terminal 92 by moving ignition 62 to OFF. This enables removal of ignition key 64, as shown in FIG. 6. With no power to solenoid 52, plunger 54 retracts to move lock bar 58 into a position blocking movement parking brake lever 22 out of the brake-applied position. Thus, the vehicle is maintained immovable by the parking brake, which cannot be released until the ignition key 64 is reinserted.

Figure 7:
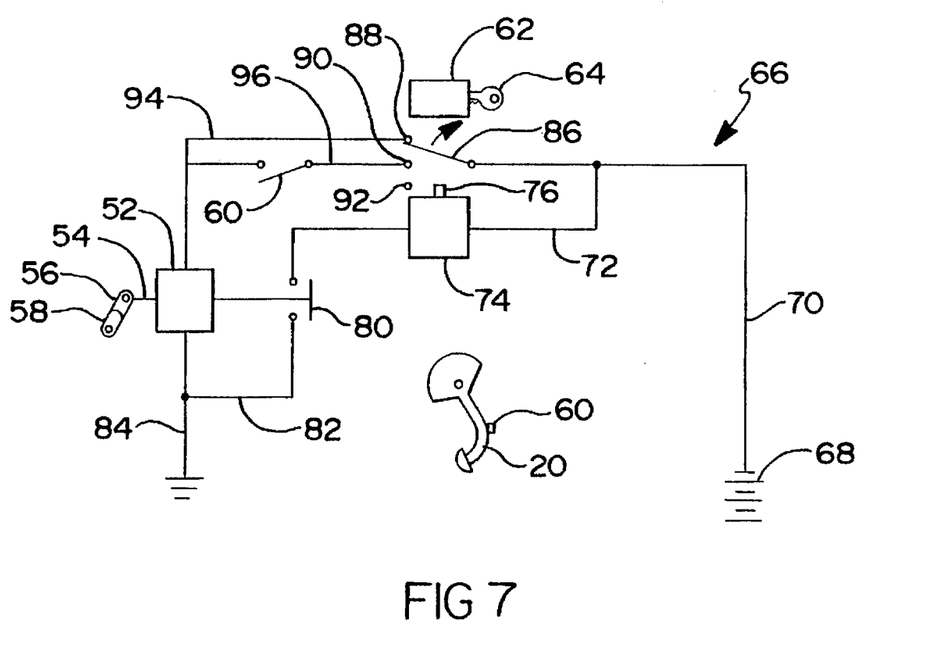
FIG. 7 is a view similar to FIG. 6, illustrating reinsertion of the key and movement of the ignition to RUN.
Figure 8:
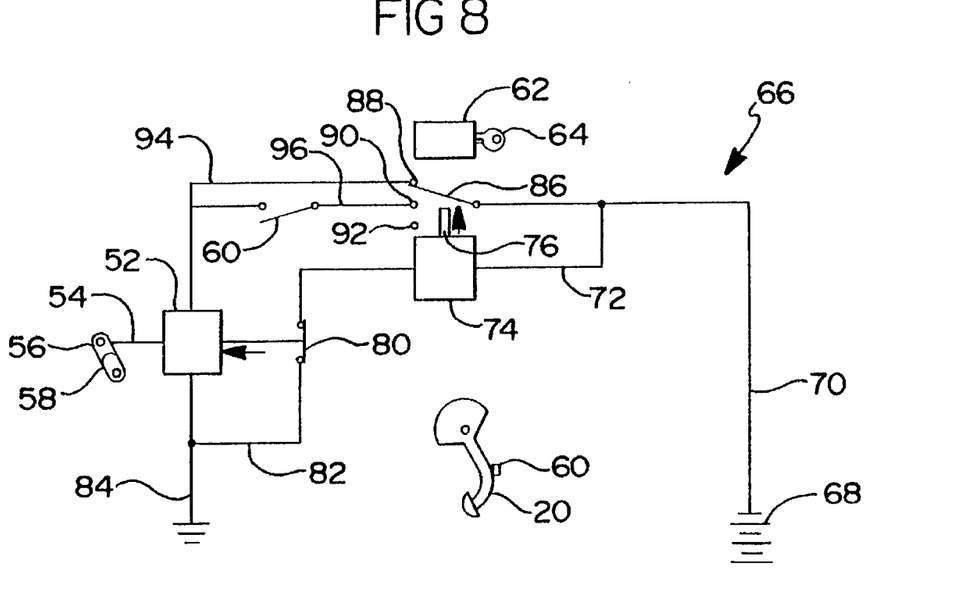
FIG. 8 is a view similar to FIG. 7, illustrating the effect of ignition movement to RUN, which effects extension of the ignition blocking solenoid to blocking position and extension of the pawl blocking solenoid to retract the pawl lock bar.
Figure 9:
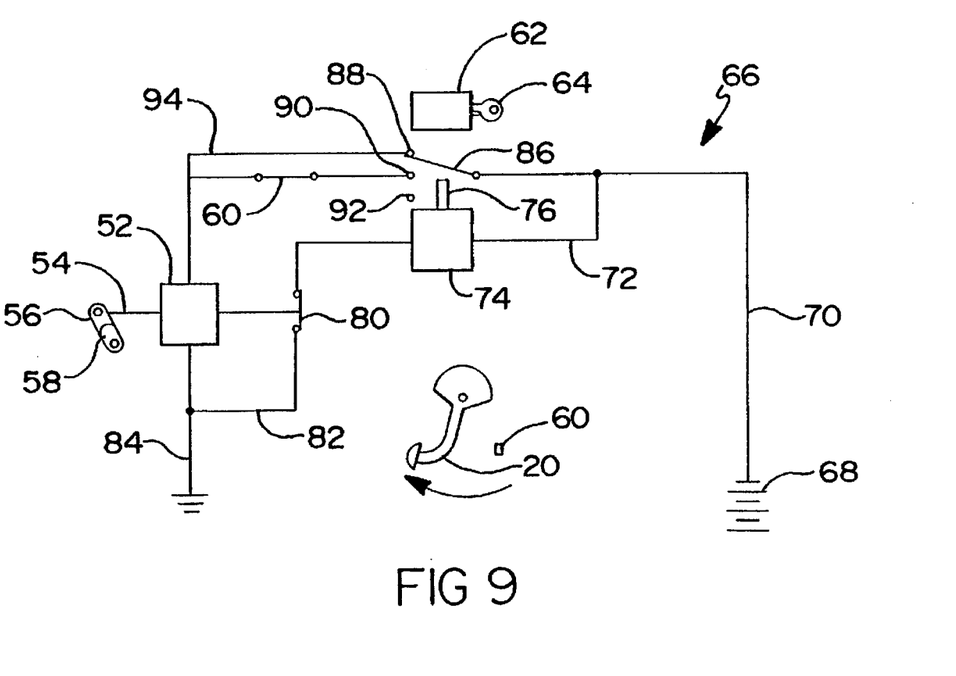
FIG. 9 is a view similar to FIG. 8, illustrating the effect FIG. 8 solenoid movement which enables movement of the parking brake actuator to the FIG. 1 brake-released position.

After key 64 is reinserted, ignition 62 is moved to RUN position which starts the vehicle engine and moves switch 86 to RUN, as shown in FIG. 7. This again powers solenoid 52, to extend blocking plunger 54 top pivot lock bar 58 out of blocking position and enable release of parking brake lever 22 for movement to brake-released position. It also closes switch 80, as shown in FIG. 8, to power solenoid 74 to extend plunger 76 to its ignition key removal blocking position.

Another embodiment of this invention is shown schematically in FIGS. 10–13. Here elements identical or similar to those of the FIGS. 3–9 embodiment are designated by the same reference numeral increased by 100. Hence, circuit 166 includes solenoids 152 and 174 having plungers 156 and 176 which perform the same functions as plungers 56 and 76 in the FIGS. 3–9 embodiment. However, solenoids 152 and 174 are bi-stable solenoids which are powered to both directions to move plungers 156 and 176 to extended and retracted stable positions.

Figure 10:
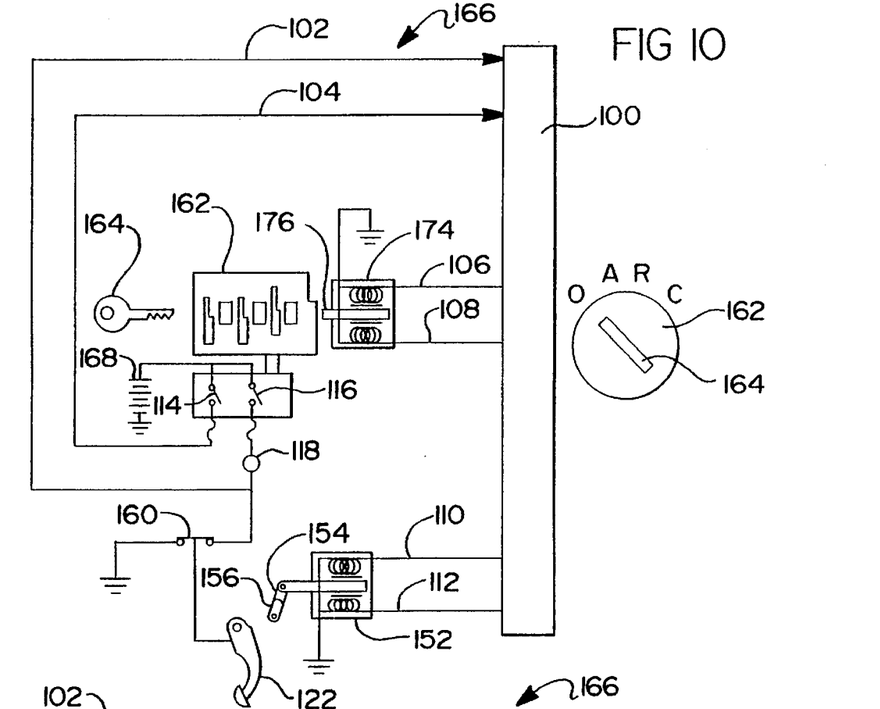
FIG. 10 is a schematic of another embodiment of an electrical control circuit for a parking brake actuator and ignition interlock system according to this invention, illustrating the actuator in brake-applied position, the ignition solenoid retracted to enable movement of the ignition to OFF and key removal, and the pawl blocking solenoid retracted to lock the actuator in brake-applied position; brake-applied position.

As shown in FIG. 10, key 162 is inserted to operate ignition 164 which is movable among OFF (O), ACCESSORY (A), RUN (R) and CRANK (C) positions. Parking brake lever 122 has a sector which is engaged by a latching pawl 134 which is locked by lock bar 158 when plunger 152 is retracted. Control circuit 166 includes a controller 100 which incorporates a microprocessor (not shown). Controller 100 is preferably a unit developed by General Motors Corporation which is termed a "PZM".

Controller 100 is supplied with "high" and "low" current inputs from lines 102 and 104. Controller 100 controls operation of solenoids 152 and 174 via outputs 106, 108 and 110, 112. When controller 100 receives a "high" input from either lines 102 or 104, it controls solenoids 154 and 174 to extend plungers 156 and 176. When controller 100 receives a "low" current input from both lines 102 and 104, it controls solenoids 154 and 174 to retract plungers 156 and 176.

A pair of switches 114 and 116 are operated by ignition 162. Switches 114 and 116 are both open in ignition OFF position and are both closed in RUN and CRANK positions. Switch 114 open and switch 116 is closed in ACCESSORY position. Input line 104 connects through switch 114 to power source 168. Input line 104 connects through a brake-applied light 118 and switch 116 to power source 168. A branch line 182 including brake position switch 160 connects input line 104 to ground. Operation of circuit 166 will now be described.

In the vehicle parked position of FIG. 10, ignition 162 is OFF, opening both switches 114 and 116. Parking brake lever 122 is latched in brake-applied position by pawl 130, opening switch 160. As a result of this circuit condition, both input lines 102 and 104 provide a low current input to controller 100, causing retraction of plunger 176, enabling removal of key 164. This circuit condition also retracts plunger 156, which pivots lock bar 158 to block pawl 130 in latched position and immobilize the vehicle.

Figure 11:
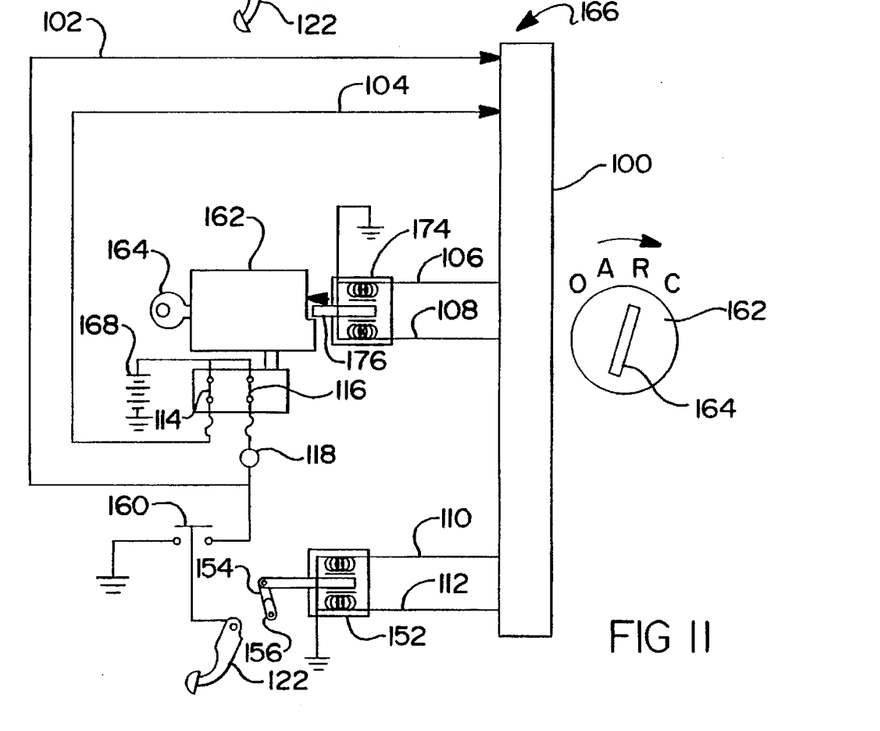
FIG. 11 is a view similar to FIG. 10, but with the ignition moved to RUN, which extends the pawl blocking solenoid to unlock the pawl and enables movement of the actuator to brake-released position, causing the ignition solenoid to extend to blocking position.

To operate the vehicle, key 164 is reinserted and ignition 162 is moved to CRANK to start the vehicle, then to RUN, as shown in FIG. 11. This closes both switches 114 and 116, providing a high current input to controller 100, which operates solenoid 174 to extend plunger 176, blocking key removal. Controller also operates solenoid 152 to extend plunger 156, pivoting lack bar 158 to unlatch pawl 130 and enable release of parking brake lever 122 for movement to brake-released position. The vehicle can now be operated in normal fashion.

Figure 12:
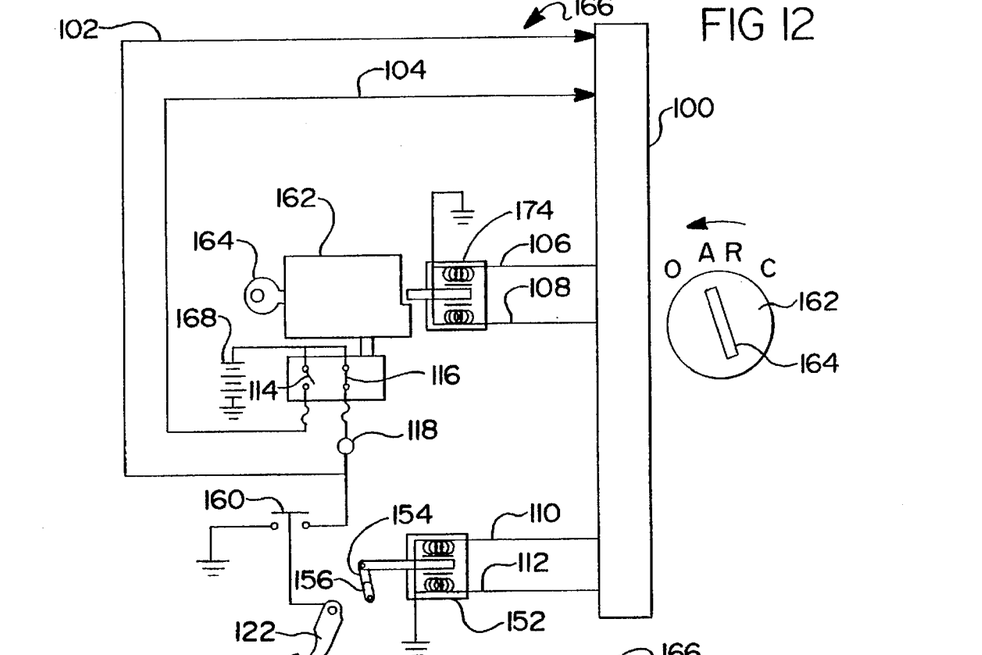
FIG. 12 is a view similar to FIG. 11, but with the ignition moved to ACCESSORY.

When it is desired to park and leave the vehicle, ignition 162 is moved to ACCESSORY, as shown in FIG. 12. This opens switch 114, while switch 116 remains closed, sending one low and one high current input to controller 100, which maintains plungers 156 and 176 as before, as long as parking brake lever 122 is in brake-released position.

Figure 13:
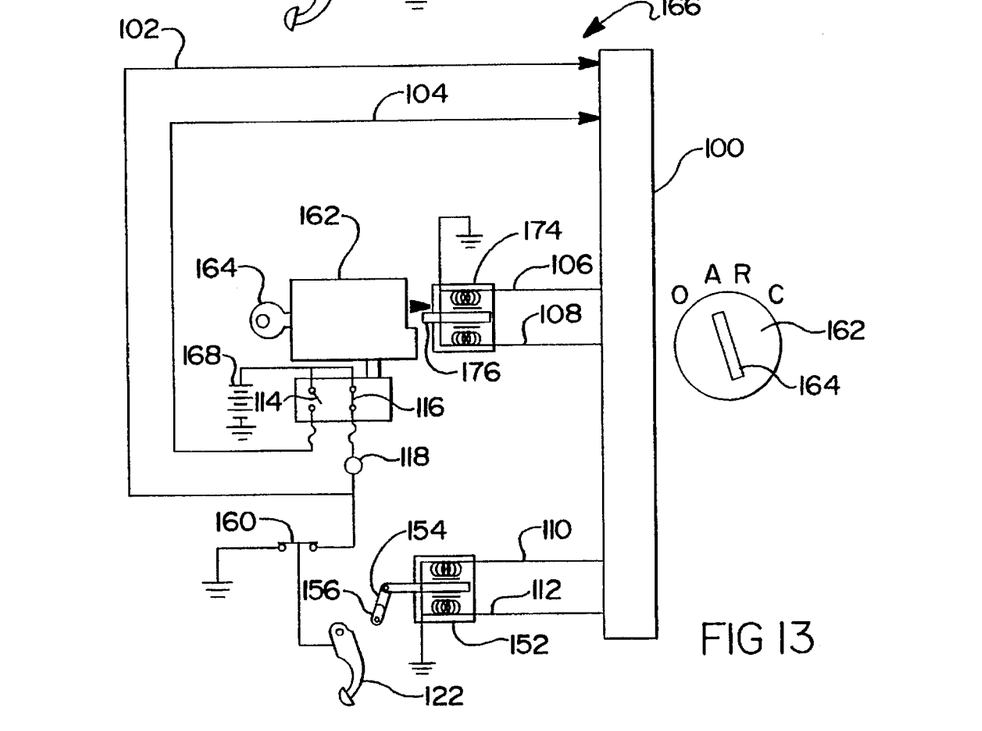
FIG. 13 is a view similar to FIG. 12, illustrating the effect FIG. 12 ignition movement and movement of the actuator to brake-applied position, which retracts the pawl blocking solenoid to lock the actuator in brake-applied position and retracts the ignition solenoid, enabling movement of the ignition to OFF and key removal, as illustrated in FIG. 10.

The effect of subsequent movement of parking brake lever 122 to a brake-applied position is shown in FIG. 13. This action will lock parking brake lever 122, as previously described. This will also close switch 160, which grounds line 104, producing a low current input to controller 100, even though switch 116 remains closed. Since controller 100 now receives low current inputs from lines 102 and 104, it controls solenoid 152 to retract plunger 156 to lock parking brake lever 122 in brake-applied position. Controller 100 will control solenoid 174 to retract plunger 176, enabling movement of ignition 162 to OFF, as shown in FIG. 10, and removal of key 164. In OFF, switch 114 is open, maintaining the low input to controller 100.

Reinsertion of key 164 and movement of ignition 162 to ACCESSORY closes switch 114. Even though line 102 remains grounded by closure of switch 160, a high current input is supplied controller 100 via line 104. This maintains plunger 156 extended to prevent release of pawl 130, locking parking brake lever 122 in brake-applied position. To release pawl 130, ignition 162 must be moved to RUN or CRANK, thus closing both switches 114 and 116. This supplies high current inputs to controller 100, as shown in FIG. 11.

While only preferred embodiments have been illustrated and described, obvious modifications thereof are contemplated within the scope of this invention and the following claims.

I claim:

1. A parking brake lock for a vehicle having a parking brake operator which includes a lever movable between a brake-released position and a range of brake-applied positions, said lock comprising a latch member, biasing means biasing the latch member into engagement with the lever in any brake-applied position to latch the lever in said position, release means connected to the latch member for disengaging the latch member from the lever and permit movement of the lever to brake-released position, release disabling means operable to provide a barrier which prevents the release means from disengaging the latch member from the lever, said release disabling means including a lock bar movable into and out of a position blocking movement of the latch member out of engagement with the lever, and control means for operating the release disabling means.

2. The parking brake lock of claim 1, wherein the lever mounts a notched latch plate and the latch member includes a pawl engageable with the latch plate notches to latch the lever in a brake-applied position.

3. The parking brake lock of claim 2, wherein the release disabling means includes an electrical solenoid operated by the control means and having a plunger connected to the lock bar.

4. The parking brake lock of claim 3, wherein the solenoid plunger is retractable to move the lock bar into blocking position.

5. A parking brake lock for a vehicle having an ignition movable between a RUN and a plurality of non-RUN positions including OFF, and a parking brake operator including a lever movable between a brake-released position and a range of brake-applied positions, said lock comprising a latch member, biasing means biasing the latch member into engagement with the lever in any brake-applied position to latch the lever in said position, release means connected to the latch member for disengaging the latch member from the lever and permit movement of the lever to brake-released position, release disabling means operable to prevent the release means from disengaging the latch member from the lever, and control means including means responsive to the position of the ignition for operating the release disabling means.

6. The parking brake lock of claim 5, wherein the release disabling means include a lock bar movable into and out of a position blocking movement of the latch member out of engagement with the lever, and the control means include means responsive to movement of the vehicle ignition to a non-RUN position to move the lock bar into blocking position.

7. The parking brake lock of claim 6, including an ignition blocking device having a position normally blocking movement of the ignition to OFF and operable to move to a position enabling said movement.

8. The parking brake lock of claim 7, wherein the control means include means responsive to movement of the lock bar into blocking position to enable movement of the blocking device to the position enabling movement of the ignition to OFF.

9. A parking brake lock for a vehicle having an ignition movable between a RUN and a plurality of non-RUN positions including OFF, and a parking brake operator including a lever operable to move between a brake-released position and a range of brake-applied positions, comprising a latch member movable into and out of engagement with the lever to latch the lever in brake-applied positions, a lock bar movable to a position blocking disengagement of the latch member from the lever, and control means responsive to movement of the ignition to a non-RUN position to operate the lock bar to blocking position when the lever is in a brake-applied position.

10. The parking brake lock of claim 9, including an ignition blocking device having a position normally blocking movement of the ignition to OFF and the control means include means responsive to movement of the lock bar to blocking position to move the blocking device out of blocking position to enable movement of the ignition to OFF.

11. A parking brake and ignition interlock for a vehicle having an ignition movable among OFF, ACCESSORY and RUN positions, a parking brake operator including a lever operable to move between a brake-released position and a range of brake-applied positions, a latch member movable into and out of engagement with the lever to latch the lever in any of a plurality of brake-applied positions, and a power source, said interlock comprising a first electrical device movable between positions blocking and unblocking movement of the ignition to OFF, a lock bar movable to a position blocking disengagement of the latch member from the lever, a second electrical device for moving the lock bar between positions blocking and unblocking movement of the latch from latched to unlatched positions to lock the lever against movement out of a brake-applied position, a position switch actuated by movement of the lever to a brake-applied position, and control means including an electrical circuit connecting the power source, the first and second electrical devices, the control means, the position switch and the ignition, wherein the control means responds to the combined movement of the lever out to a brake-applied position and movement of the ignition to ACCESSORY to cause the second electrical device to move to blocking position and cause the first electrical device to move to unblocking position, thereby locking the lever in brake-applied position and enabling movement of the ignition to OFF.

12. The parking brake lock of claim 11, further including first and second control switches operated by the ignition, the first control switch being closed in the RUN position and open in the ACCESSORY and OFF positions and the second control switch being closed in the RUN and ACCESSORY positions and open in the OFF position, wherein the first and second electrical devices are bi-stable solenoids extensible to blocking position and retractable to unblocking position, the control means include a controller which responds to a low input signal to retract the first solenoid and extend the second solenoid and which responds to a high input signal to extend the first solenoid and retract the second solenoid, and wherein the electrical circuit includes a first branch including the first control switch and a second branch including the second control switch, each branch connecting the power source and the controller to provide a low input signal to the controller when open and to provide a high input signal to the controller when closed, with the second branch having a leg including the position switch connecting the second branch to ground when closed to cause the second branch to provide a low input signal even if the second control switch is closed.

* * * * *